May 14, 1957

C. T. DENKER 2,791,881

COMBINED DIESEL AND STEAM ENGINE

Filed June 17, 1954

INVENTOR.
Charles T. Denker
BY Robert L. Kahn
Attorney

United States Patent Office 2,791,881
Patented May 14, 1957

2,791,881

COMBINED DIESEL AND STEAM ENGINE

Charles T. Denker, Chicago, Ill.

Application June 17, 1954, Serial No. 437,447

3 Claims. (Cl. 60—15)

This invention relates to a combined diesel and steam engine, and particularly to a diesel engine wherein a steam engine is attached to and forms a part thereof and operates from the waste heat from the diesel engine.

The present invention, while useful with either 2-cycle or 4-cycle diesel engines, is particularly adapted for 4-cycle engines and for convenience will be described in connection therewith.

A 4-cycle diesel engine has one power stroke for every two revolutions of the crank shaft. In general and beginning with the intake, the first 180° of crank shaft rotation is taken up with fuel and air intake. The next 180° has the piston going up for compression. The third 180° travel of the crank shaft has the piston travelling down on the power stroke with the fuel burning. The fourth 180° travel of the crank shaft has the piston going up for exhausting the spent gases. The above designation of the four cycles divided into 180° intervals is simply for convenience. In practice, the angular extent of each cycle may vary from precisely 180°.

As is well known, the ignition or burning of the fuel in the cylinder of a diesel engine is accomplished because of the rise in temperature due to heat of compression. During the power stroke, the fuel burning at a more or less steady rate results in an expansion of gas within the cylinder and thus generates a force on the piston head resulting in a power stroke. However, when the piston has reached the bottom of its stroke, the spent gases are still at a high temperature in comparison to the atmosphere. Various attempts have beeen made to utilize the heat of the burnt gases in such an engine with a view to increasing the overall efficiency of conversion of energy from combustion of the fuel. Such attempts have been unsuccessful for a number of reasons. Thus many proposals for utilizing such waste heat has involved the creation of back pressure upon the diesel exhaust. This greatly reduces the efficiency of the diesel engine. Other proposals have involved complex mechanism and have resulted in such additional load on the engine and additional cost and waste as to render such proposals impractical.

In accordance with this invention, the waste heat from a diesel engine is utilized in a simple and effective manner, this waste heat being useful for generating steam in the cylinder of an auxiliary engine. The invention in general contemplates a composite engine wherein each unit of the engine consists of a diesel cylinder and a steam cylinder operating as a composite unit.

For simplicity, a simple composite unit consisting of a single diesel engine cylinder and steam engine cylinder will be described in general terms so that the general nature of the invention may be understood. A diesel engine cylinder of the 4-cycle type having the usual air inlet, fuel inlet and exhaust will be coupled to a steam engine cylinder in the following manner. The steam engine will have one inlet connected directly to the exhaust of the diesel cylinder. The steam engine will also have its own exhaust and will have an inlet for a metered quantity of water. The steam engine itself will operate at much lower pressure than the corresponding diesel engine cylinder in much the same manner that the low pressure stage of a turbine, for example, operates at a lower steam pressure than the high pressure stage. The steam engine cylinder and piston will have a larger displacement than the diesel engine, the ratio depending upon the operating characteristics of the two. The piston of the steam engine and of the diesel engine will be coupled to the same crank shaft but be 180° out. Both the steam and diesel cylinders will have suitable valve gear controlled by a cam shaft, rotating one turn for a turn of the crank shaft.

Hot exhaust gases from the diesel engine cylinder will be discharged into the steam engine cylinder, the steam engine intake valve and the diesel cylinder exhaust valve operating simultaneously. Since the steam piston and the diesel piston are 180° out of phase, the hot exhaust gases from the diesel cylinder will be forced out from the diesel cylinder into the steam engine cylinder, the piston in the steam engine cylinder going down. After the steam piston has reached the bottom of its stroke, this corresponding to the end of the exhaust travel of the diesel piston, the piston in a steam engine will start compressing the hot gases in the steam engine cylinder. The intake valve which has previously supplied hot exhaust gases will be closed and the piston will start compressing the gas. When the steam piston has reached the top of its stroke, a metered quantity of water is injected into the cylinder. The injection of water into the hot gas will cause steam to be generated and the next downward travel of the piston will be a power stroke, this corresponding to a compression stroke of the diesel piston. Thus both the diesel and steam cylinders will be operating on a 4-cycle characteristic.

For a more thorough understanding of the invention, reference will now be made to the drawing wherein a diagrammatic embodiment of the invention is illustrated, it being understood, however, that variations may be made within the scope of the invention as defined by the appended claims.

Referring to the drawing.

Figure 1:
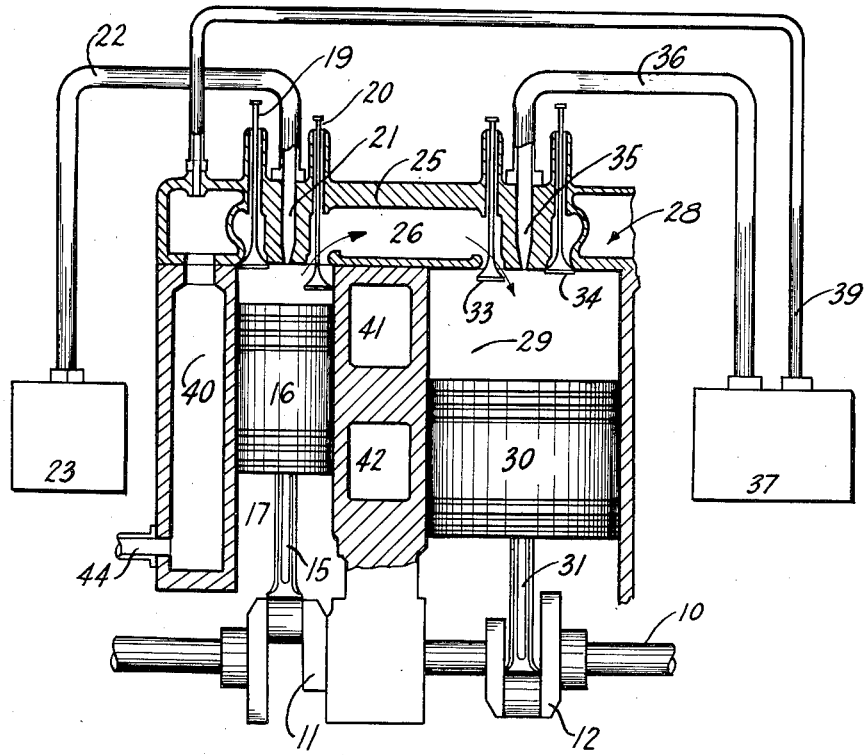
Figure 1 is a view partly in section and partly in diagrammatic form of one unit of an engine embodying the present invention.

Referring now to the drawing, 10 indicates a crank shaft having offsets 11 and 12 180° apart. Crank shaft 10 may be supported in bearings and may be followed by additional cylinder units. Referring to offset 11 of the crank shaft, connecting rod 15 is connected thereto, this connecting rod being coupled to piston 16. Piston 16 operates in cylinder 17. This part of the engine is the diesel part and will have conventional air inlet valve 19, exhaust valve 20 and fuel inlet means 21. The means for operating exhaust valve 20 is not shown, such means being customarily operated from a cam shaft geared to the crank shaft so that the valve is operated in properly timed relation. Inasmuch as such diesel cylinders are old, no detailed description of such valve gear is necessary.

Coupled to fuel inlet 21 is fuel supply pipe 22 and fuel injection means 23. Fuel injection means 23 maintains a supply of fuel in line 22 under a desirable pressure. The fuel may be diesel oil, gasoline or any other type of fuel used in diesel engines. Fuel inlet means 21 comprises suitable injector mechanism operated in timed relation to inject a metered quantity of fuel at the top or near the top of the compression stroke of piston 16, the fuel being injected under great pressure.

The diesel engine part is provided with exhaust manifold 25 having exhaust chamber 26 into which the exhaust may discharge when exhaust valve 20 is opened. Exhaust manifold 25 extends to a steam engine cylinder generally indicated by 28 and consisting of cylinder 29 in which piston 30 operates. Piston 30 is connected by connecting rod 31 to crank shaft offset 12. Steam engine cylinder 29 has the head thereof provided with inlet valve 33, exhaust valve 34 and injector means 35. Injector means 35 is connected by pipe 36 to subsidiary injector means 37.

Subsidiary injector means 37 is connected by pipe 39 to water jacket 40 enclosing the cylinder for the diesel engine. The part of the engine separating the steam and diesel cylinders may be divided into two jacket compartments 41 and 42, these two compartments, however, being connected to jacket 40. Jacket 40 has water inlet connection 44 adapted to be supplied with water, the water preferably being distilled.

Figure 2:
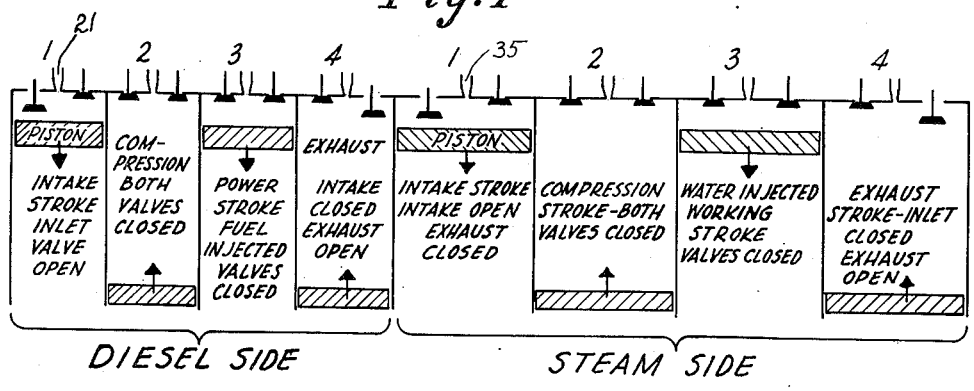
Figure 2 is a valve diagram illustrating the timing of the diesel and steam cylinders.

Exhaust valve 20 of the diesel cylinder and inlet valve 33 of the steam cylinder are tied together so that they operate simultaneously. The timing of the various valves for the diesel and steam cylinders is indicated in Figure 2. Referring to Figure 2, it will be noted that the valve action for each cylinder is divided into four parts, each corresponding to approximately 180° of crank shaft rotation. It will be understood that the timing illustrated in the diagram is not precisely as might be used in practice since in some instances there might be an advance or delay of the action from the showing in order to compensate for variations in engine speed, elimination of knocking and the like.

Referring to the diesel side of the diagram, the valve action starts with the intake stroke, this part being numbered 1 and continuing to the final exhaust stroke numbered 4. On the steam side, the intake stroke numbered 1 corresponds in time to the exhaust stroke of the diesel side. As has been previously pointed out, the intake stroke for the same engine starts substantially at the same time as the exhaust begins for the diesel. Thus the steam engine cycle is delayed by substantially 270° with respect to the diesel cycle. On the second part of the steam cycle, the piston compresses the exhaust gases thus raising their temperature. The third part of the steam cycle results in water being injected into the hot compressed exhaust gases. The resulting steam causes a rise in pressure within the cylinder in spite of the fact that the temperature of the gases within the cylinder had been reduced due to the injection of water and the subsequent vaporization thereof. The fourth part of the steam cycle results in the contents of the cylinder being exhausted. It is understood that the exhaust of the steam is to atmosphere or to some suitable means and is not connected with the diesel in any fashion.

No attempt has been made to show valve gear or operating means for the valves since valves and cam shafts for operating the valves are well known. Thus the air intake valve for the diesel cylinder is simply a spring biased valve which is forced open upon the suction pressure within the cylinder generating sufficient force upon the valve. At other times when the cylinder pressure is equal to or greater than atmosphere, the air intake valve is closed. The various injector valves utilize well known injector valve mechanisms and require no detailed description.

As is clearly indicated in the drawing, piston 30 of the steam cylinder has a substantially larger area than piston 16 of the diesel. Thus the diameter of the steam piston may be twice the diameter of the diesel piston. The stroke of the two pistons may be the same. It is also possible to have the diameters of the pistons the same and alter the stroke so that the displacement of the steam cylinder is larger than that of the diesel cylinder. A combination of different strokes and different piston diameters may also be used. The ratio of displacements of the steam and diesel cylinders will depend upon desired operating characteristics, the temperature of gases discharged from the diesel engine, the speed of operation of the engine, and other factors.

Instead of having the diesel and steam pistons arranged in side-by-side relation, it is possible to arrange the pistons in tandem so that both are on the same piston rod and will naturally have the same stroke. In such case, the piston rod will have to pass through one of the pistons. The layout of the engine will be complicated with such a tandem arrangement of pistons and the arrangement illustrated in Figure 1 is preferred.

The water supply entering inlet 44 will be warmed in the jacket of the diesel engine and part of this water will be supplied to water injector 37. Injector 37 will supply water to high pressure injector 35, this latter being timed in the same manner as gas injector 21, the two injectors operating at the same part of the cycle of the two cylinders. The two injectors may be the same except that injector 35 will operate at a lower pressure than injector 21.

It is understood, of course, that injectors 21 and 35 are the metering type which measure a certain amount and inject the same at high pressure into the cylinder.

What is claimed is:

1. A combined engine unit comprising a single cylinder 4-cycle diesel engine having intake and exhaust valves, a single cylinder steam engine, said steam engine having intake and exhaust valves and having water injection means, means for coupling said two engines together, means for operating said diesel engine valves for conventional 4-cycle operation, means for operating said steam engine intake and exhaust valves in a cycle similar to the diesel engine, said diesel engine cycle being advanced about 270° ahead of the steam engine cycle, said diesel engine exhaust and steam engine intake valves being opened and closed together, means for feeding the diesel engine exhaust to the steam engine intake and means for injecting a metered quantity of water into the steam cylinder after closure of said steam engine intake valve at about the beginning of the steam working stroke, said steam engine cylinder generating steam when said water has been injected into the same and thus utilizing the waste heat from the diesel exhaust.

2. The construction according to claim 1 wherein said two units are coupled together on a common shaft and wherein the steam engine has a larger displacement than the diesel engine.

3. A combined engine unit comprising a single cylinder 4-cycle diesel engine having intake and exhaust valves, a single cylinder steam engine, said two engines having a common crank shaft, said steam engine having intake and exhaust valves and having water injection means, means for operating said diesel engine valves for conventional 4-cycle operation, means for operating said steam engine intake and exhaust valves in a cycle similar to the diesel engine, said diesel engine cycle being advanced about 270° ahead of the steam engine cycle, said diesel engine exhaust and steam engine intake valves being opened and closed together, means for feeding the diesel engine exhaust into the steam engine intake and means for injecting a metered quantity of water into the steam cylinder after closure of said steam engine intake valve at about the beginning of the steam working stroke, said water being turned into steam when said water has been injected into the same, thus utilizing the waste heat from the diesel exhaust.

References Cited in the file of this patent

UNITED STATES PATENTS

| 796,425 | Houkowsky | Aug. 8, 1905 |
| 899,625 | Schneider et al. | Sept. 29, 1908 |
| 904,807 | Reeve | Nov. 24, 1908 |
| 967,828 | Pierson | Aug. 16, 1910 |
| 2,217,192 | Wuehr | Oct. 8, 1940 |